United States Patent [19]

MacGregor et al.

[11] Patent Number: 4,457,777

[45] Date of Patent: Jul. 3, 1984

[54] STEELMAKING

[75] Inventors: Ian K. MacGregor, Robert Scholey, both of London; Gene D. Spenceley, Stokesley, all of England

[73] Assignee: British Steel Corporation, England

[21] Appl. No.: 413,872

[22] Filed: Sep. 1, 1982

[30] Foreign Application Priority Data

Sep. 7, 1981 [GB] United Kingdom ............... 8127021

[51] Int. Cl.³ .............................................. C21C 7/00
[52] U.S. Cl. ......................................... 75/51; 75/46; 75/52; 75/59; 266/212
[58] Field of Search .................. 75/51, 52, 59, 60, 46; 266/212, 215, 217

[56] References Cited

U.S. PATENT DOCUMENTS

| 2,562,813 | 7/1951 | Ogorzaly | 75/60 |
| 3,634,065 | 1/1972 | Worner | 75/46 |
| 3,702,695 | 11/1972 | Rouanet | 75/46 |
| 4,089,677 | 5/1978 | Spenceley | 75/51 |
| 4,329,171 | 5/1982 | Robert | 75/52 |
| 4,358,314 | 11/1982 | Normanton | 75/60 |

Primary Examiner—Peter D. Rosenberg
Attorney, Agent, or Firm—Bacon & Thomas

[57] ABSTRACT

The invention provides an arrangement for steelmaking comprising a steel melt and initial reaction chamber arranged to receive source material in the form of scrap and/or pre-reduced iron, an overhead lance for the introduction of an oxidizing gas to the initial reaction chamber, means for introducing, below the level of the surface of the melt in the reaction chamber, a melt stirring fluid medium, means for introducing carbonaceous material into the melt; a secondary refining chamber connecting with the initial reaction chamber at the surface level of the melt and through which the metal is arranged to pass from the initial reaction chamber; and a melt holding vessel into which the metal is passed from the secondary refining chamber.

31 Claims, 5 Drawing Figures

STEELMAKING

This invention relates to steelmaking, and more particularly processes and apparatus for continuous steelmaking having an input source of solid ferrous bearing material and an output of refined or partially refined steel.

Numerous proposals have been made for continuous steel-making processes; the premise essentially being that a continuous process should be capable in principle of greater cost effectiveness than batch processes for the production of steel.

The majority of earlier proposals have been based upon a source material of blast furnace iron sometimes together with ferrous scrap although some processes proposed have avoided the need for blast furnace material and utilised a starting material of ore or prereduced ore together at times with ferrous scrap.

It is an object of the present invention to provide an arrangement for continuous steelmaking capable of the efficient production of refined or partially refined steel.

According to one aspect of the invention there is provided apparatus for steel-making comprising a steel melt and initial reaction chamber arranged to receive source material in the form of scrap and/or pre-reduced iron, an overhead lance for the introduction of an oxidising gas to the initial reaction chamber, means for introducing, below the level of the surface of the melt in the reaction chamber, a melt stirring fluid medium, means for introducing carbonaceous material into the melt; a secondary refining chamber connecting with the initial reaction chamber at the surface level of the melt and through which the metal is arranged to pass from the initial reaction chamber; and a melt holding vessel into which the metal is passed from the secondary refining chamber.

The secondary refining chamber may be of limited depth compared to that of the initial reaction chamber, and may be constituted by a launder.

Alternatively the secondary refining chamber may have a depth of the same order as the initial reaction chamber and may act as a recognisable reaction container, possibly incorporating means for injecting stirring gases or reagents into melt therein.

Again the secondary refining chamber may comprise a launder followed by a reaction container.

It will be understood that a slag or flux will be carried by the molten metal within the secondary refining chamber.

According to another aspect of the invention there is provided a method of steelmaking comprising subjecting source material in the form of scrap and/or pre-reduced iron to melting and initial reaction in an initial chamber by the introduction from overhead of an oxidising gas, by the introduction below the level of the surface of the melt of a stirring fluid medium, and by the introduction of carbonaceous material; subjecting the melt to secondary refining in a secondary chamber connecting with the initial chamber at the surface level of the melt.

The arrangement may be such that a slag or flux on the surface of the molten steel travels at a different speed or in counter-flow to the metal in passage through a launder consisting of or forming part of the secondary refining chamber. Such an arrangement assists slag/metal chemistry.

It will be appreciated that in such an arrangement melting occurs in the initial reaction chamber, and metal continuously passes to and through the launder where full slag/metal separation and chemical equilibration occurs resulting in a reduction in the sulphur content of the melt via slag/metal reactions encouraged by the differing rate of flow of slag and metal.

Where the secondary refining chamber comprises a reaction container incorporating means for injecting stirring gases and reagents, desired refining reactions can be attained therein to modify the slag and metal compositions.

The output steel may be fed directly to a metal holding vessel, at which stage an essentially batch process is in effect, with the possibility of further refining and/or compositional control in the holding vessel.

By this arrangement we believe it is possible to achieve the cost and energy benefits of continuous steel making, including energy generation and usage possibilities inherent therein, whilst avoiding the special problems of in line compositional control and casting of a stream of metal of initial crude composition. These problems include metal reoxidation and transportation and the need to ensure the provision of a stream of constant mass flow, composition, and temperature.

The arrangement may be such that offtake gases from the initial reaction chamber and from the refining chamber pass above the refining chamber so that a proportion of the heat from the offtake gases is transferred to the metal and slag therein.

Various refining fluxes and reagents may be introduced both into the initial reaction chamber and into the secondary refining chamber in order to effect, wholly or in part, the bath chemistry.

A slag dam and weir may be provided adjacent the metal outflow position from the refining chamber, thereby allowing passage of slag free metal into the metal holding vessel and assisting counter-flow of slag which can be arranged for tapping on a side of the initial reaction vessel remote from the launder.

The output molten steel holding vessel may be arranged for final compositional control of the steel. The vessel may be of a double chamber form of the kind covered by our copending United Kingdom Patent Application No. 82.18203.

Means may be provided for introducing steam into the arrangement. Thus means may be provided for introducing steam into the offtake gas passage so as to enable the water gas shift reaction to occur i.e. the reaction of carbon monoxide present in the offtake gas with the steam to generate hydrogen. By this means the off-gas can be adjusted in composition, particularly with respect to the $CO/H_2$ ratio which may be desirable for optimising gas usage.

Steam may also be introduced into the melt within the reaction vessel so as to provide a control of heat liberation within the melt and/or control of off-gas composition.

The offtake gases from the arrangement may be used for preheating and/or pre-reducing the source material for the initial reaction chamber.

In one embodiment a direct reduction furnace may be arranged to feed direct reduced iron to the initial reaction chamber and in this case the offtake gases may be utilised as a reductant in the direct reduction furnace.

The output from the direct reduction furnace may be fed directly to the initial reaction chamber in a hot condition, such as at approximately 800° C., thereby reducing the energy requirements for melting.

With an arrangement of this kind it is possible to provide an output product from the direct reduction furnace having a lower metallisation than would be normally acceptable (normal metallisation requirements being of the order of 90% or more) because reduction can readily be completed in the initial reaction chamber. With a limited metallisation requirement of the kind envisaged, it is possible in practice to limit offtake gas usage in the reduction furnace to one pass, the output gas therefrom being usable as a fuel elsewhere in the plant.

The initial reaction chamber and the secondary refining vessel may be operated at above atmospheric pressure, such as at between 3 and 6 atmospheres. By this means propulsion for the offtake gas through the direct reduction furnace is provided, and slag foaming in the initial reaction chamber, with its associated control and melting rate limitation problems, is very significantly reduced.

In order that the invention may be more readily understood a number of embodiments thereof will now be described by way of example with reference to the accompanying drawings in which.

Figure 1:
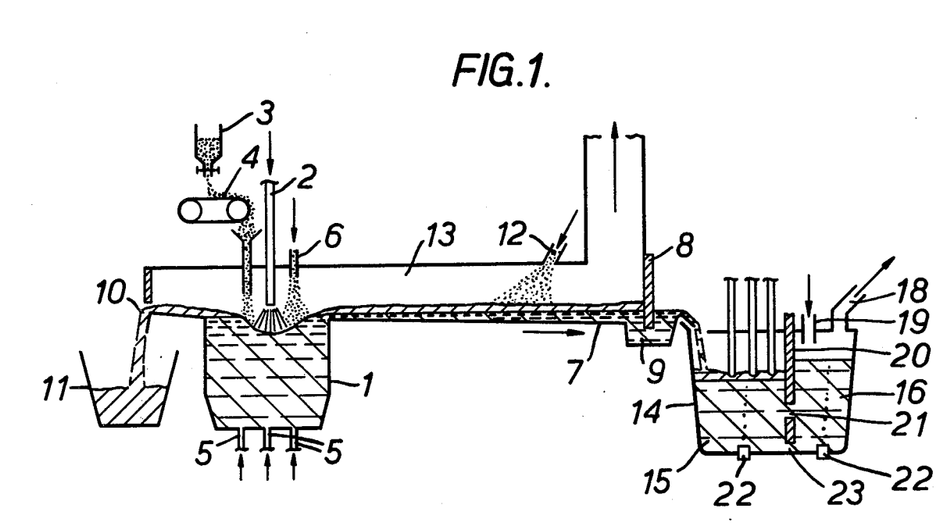
FIG. 1 is a diagrammatic side representation of continuous steelmaking apparatus in accordance with the invention.

Referring now to FIG. 1 it will be seen that the apparatus comprises in initial reaction chamber 1 for the initial melting and refining of molten steel. A refining and heating gas (usually oxygen) is directed onto the upper surface of the melt within the chamber by means of a lance 2. Feedstock is provided via a hopper 3 and a conveyor belt 4 and comprises a pre-reduced iron in granular or pelletised form. Alternatively the feedstock could be prepared scrap, granulated blast furnace iron, or other ferrous source material.

Tuyeres 5 are provided in the base of the reaction chamber 1 through which carbonaceous material such as coal (for heating purposes) together with oxygen and/or an inert gas for melt stirring purposes may be injected. Appropriate refining fluxes may be added via an inlet pipe 6 located above the reaction chamber 1.

A launder 7 (constituting a secondary refining chamber) is connected to one side of the reaction chamber through which output metal from the reaction chamber flows. A slag dam 8 and metal weir 9 is provided adjacent the output end of the launder 7, and a slag output port 10 is provided on the opposite side of the chamber 1 to the launder so that counter-flow between slag and molten metal is accomplished within the launder. Slag flowing from its outlet port 10 is collected in a slag ladle 11 of normal configuration.

It is to be observed that an additional inlet 12 for fluxes above the launder is provided and that the gas offtake passage 13 extends above and along the launder before being directed upwardly away from the apparatus.

Molten metal passing from the initial reaction chamber 1 through the launder 7 is subjected to refining and compositional control by means of the added fluxes and by means of slag/metal reactions. In some arrangements additional oxygen may be added to the slag/metal as it passes through the launder.

On leaving the launder, the metal passes into a holding vessel 14 which is of the kind described and illustrated in detail in our copending United Kingdom Patent Application No. 82.18203. Essentially the vessel comprises two chambers 15 and 16 in one of which 15 the incoming steel is heated by arc electrodes 17. In the other chamber 16 compositional control by vacuum and/or purging processing (vacuum being provided via pipe 18) and by the addition of alloy materials and reagents (through pipe 19) can be carried out. It will be observed that the wall 20 separating the two chambers of the vessel is pierced by ports 21 and 23, and that gas is bubbled into both chambers via tuyeres 22. By this means movement of metal between the two chambers is assured. After completion of the necessary compositional control, the refined steel may be transferred to a casting station for casting in a normal manner.

Figure 2:
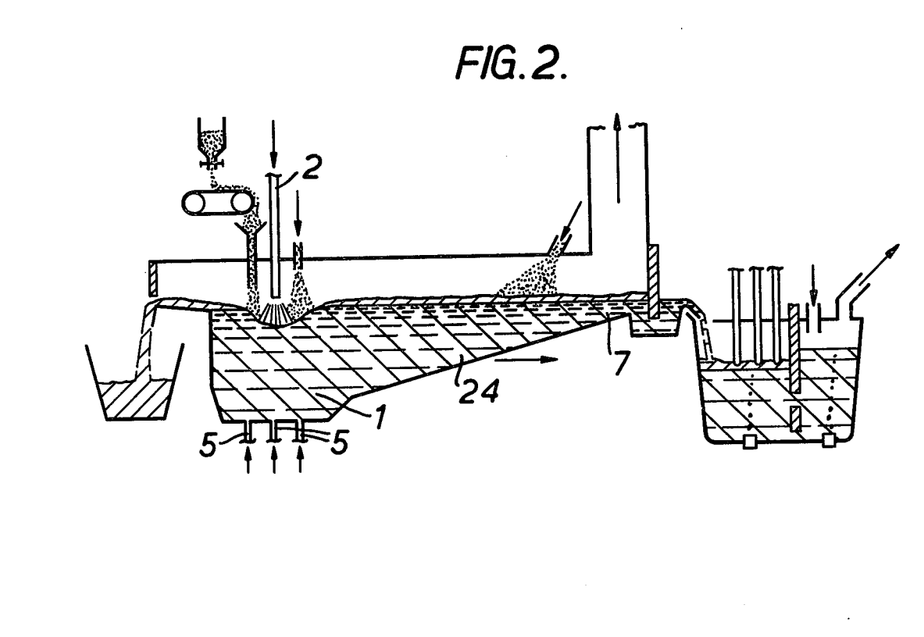
FIG. 2 is a variant of the apparatus illustrated in FIG. 1.

The variant of the invention illustrated in FIG. 2 is essentially similar to the apparatus of FIG. 1 except that the initial reaction chamber 1 is extended as shown at 24 into the final refining launder 7 so as to provide additional time, and metal volume, to achieve equilibrium of reaction.

The arrangement of FIG. 2 also illustrates variation in the mode of addition of carbonaceous material to the reaction chamber 1. Thus powdered coal is injected via the overhead oxygen lance 2, the basal tuyeres 5 being used for the injection of oxygen or oxygen containing gas and/or inert gas for melt stirring purposes. In yet another variant (not illustrated) coal may be added to the reaction chamber 1 in granular or lump form by means of an overhead chute in association with bath stirring.

An alternative or additional variation (not illustrated) of the arrangement of FIG. 1 provides a weir located between the initial reaction chamber 1 and the refining launder 7 so as to enable slag and metal droplets only to be carried into the refining launder. A slag output port will be provided from the refining launder.

In yet another variant of the arrangement illustrated in FIG. 1 movement of molten steel through the refining launder can be by means of electro magnetic inductors up an inclined base of the launder. In this way slag will naturally flow counter to the metal travel direction, and the requirement for a slag dam at the exit from the launder is removed.

Figure 3:
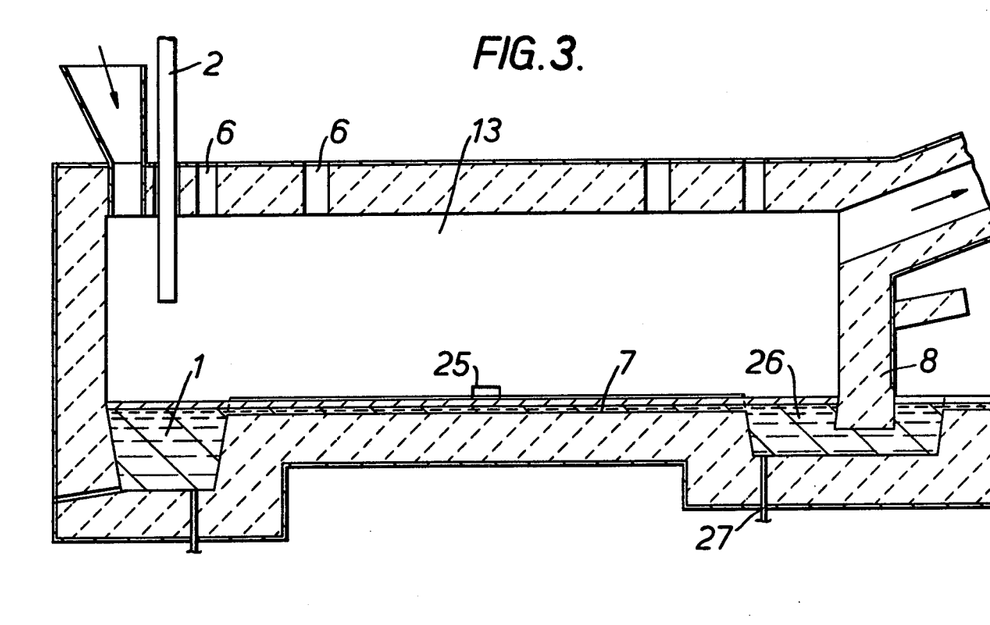
FIG. 3 is another variant of the apparatus of FIG. 1.

The apparatus shown in FIG. 3 is basically in terms of operation very similar to that of FIG. 1 and similar parts have been allocated the same reference numbers. There are a number of physical variations however.

Thus it will be seen that slag is tapped from a tap hole 25 part way along the launder 7.

It will also be noted that the secondary refining chamber comprises not only the launder 7 but also a reaction container 26 within which is located the slag dam 8. A tuyere 27 is provided within container 26 for the provision of stirring and/or refining gases to the steel within the container.

Figure 4:
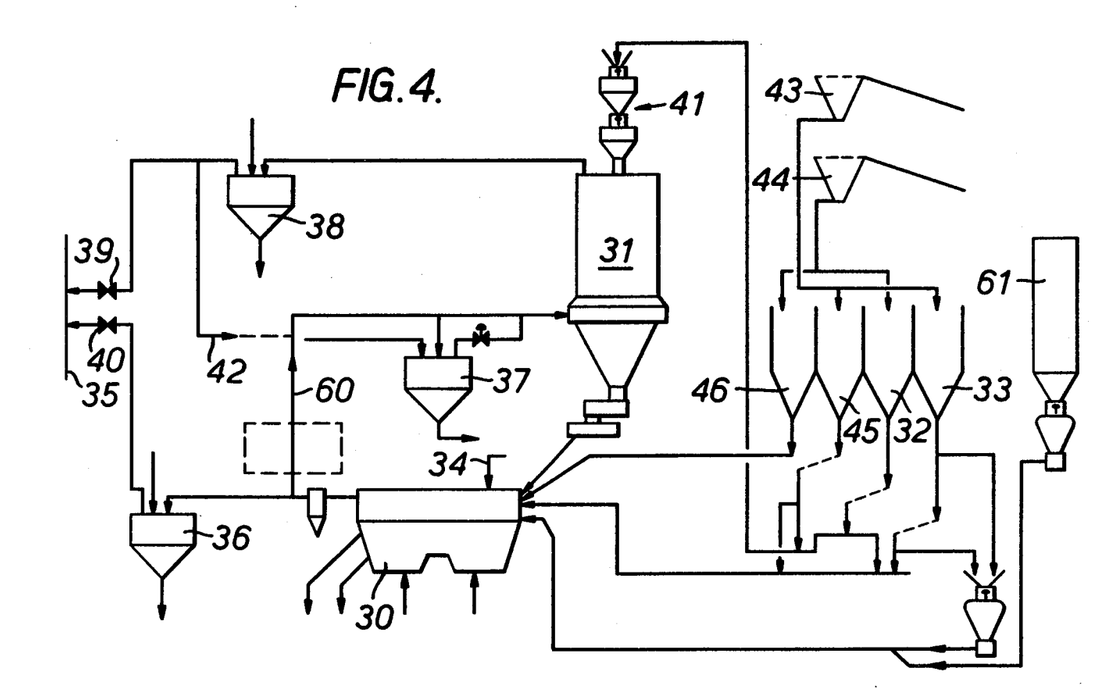
FIG. 4 is a diagrammatic representation of steelmaking apparatus incorporating a further embodiment of the invention and including a direct reduction furnace.
Figure 5:
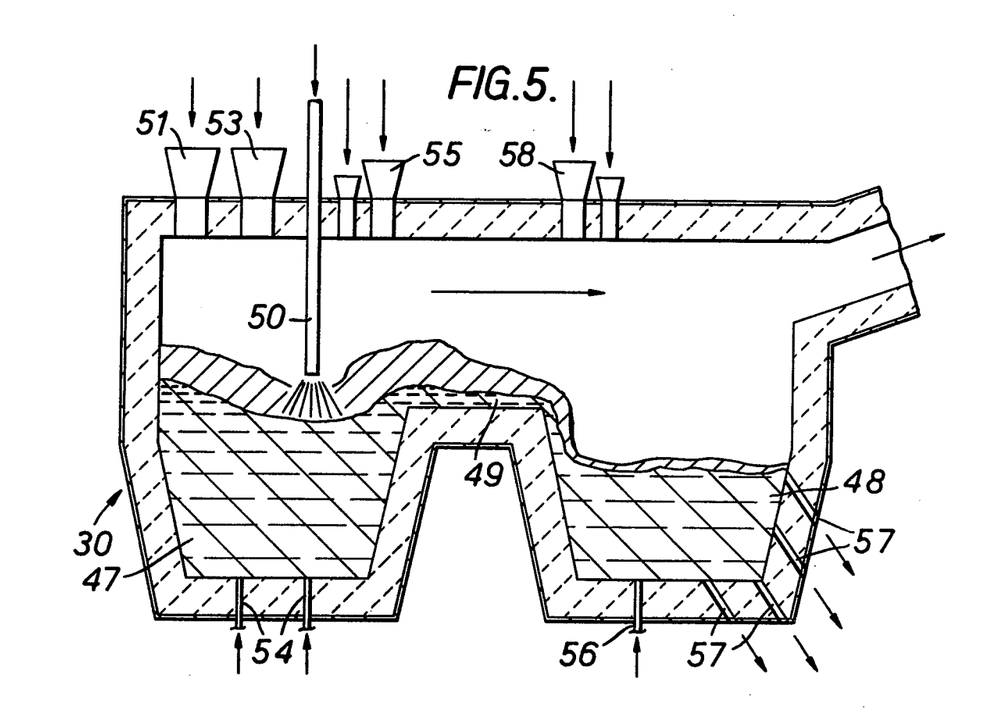
FIG. 5 is a diagrammatic representation of the initial reaction chamber and secondary refining chamber of the apparatus of FIG. 4.

The apparatus illustrated in FIGS. 4 and 5 constitutes an extension of the arrangements hereinbefore described to include an inline direct reduction furnace. In this arrangement a continuous melting and refining unit 30 is connected to a direct reduction shaft 31 of a kind generally known for reducing pelletised and/or lump ore to iron.

The continuous melting unit 30 may be fed with either hot DRI from the shaft furnace 31 or with cold DRI (direct reduced iron) from a storage hopper 32 together with coal from hopper 33 and oxygen via lance 34. The melting process produces gas at a pressure of up to five bar and this may either be passed directly to a waste gas duct 35 via pressure reducing valve 40 or to the direct reduction shaft via duct 60. In either case the gas would be cooled, via direct contact cooler/scrubbers 36 or 37 respectively, although when feeding gas to the direct reduction shaft the gas would only be cooled to about 800° C. The direct reduction shaft 31 has reducing gas fed in via a toroidal bustle (not shown), and passes in counter-current through a bed of pellets to emerge at the top of the shaft. The shaft is operated at elevated pressure comparable with the melter unit 30 operating pressure, and in this configuration pumping of the gas is not required. The top-gas leaving the d.r. shaft is cleaned and fully cooled to around ambient temperature by means of a direct contact cooler/scrubber 38 before discharging through a pressure reducing valve 39 into waste gas duct 35. Alternatively the cooled/scrubbed gas can be connected at 42 for recycling into the duct 60 or use as a fuel elsewhere in the plant.

The shaft is fed with either ore or DRI via a lock hopper arrangement 41 the hot DRI product from the shaft being passed through a discharge valve into the melter unit 30. The purpose of feeding DRI to the shaft is to use it as a preheater to enable a higher feed rate of hot DRI to be melted than could be produced by the shaft working as a reduction unit.

The system incorporates reception hoppers 43,44 to allow transport of the raw materials directly into the plant and storage facilities in bins 32,33,45 and 46 for at least one day's requirements, and transport systems to transfer each of the raw materials to the point of use.

The melting and refining unit 30 consisting of an initial reaction (or melting) chamber 47 and a secondary refining container 48 linked together by a short launder 49, as shown in FIG. 5. Operation of the unit relies on the continuous input of raw materials to produce a liquid melt and a continuous supply of gas which is passed from the unit through a gas treatment plant, to become the reducing gas for the Direct Reduction Shaft 31. To provide the off-gas with sufficient driving force to pass through all the pipework and the direct reduction shaft it is necessary to operate the unit 30 at a relatively high pressure, up to a maximum of 5 atmospheres. The unit 30 is therefore a pressure vessel operating with an internal temperature of at least 1600° C. and as such its shell design, construction and choice of refractories is more critical than for conventional steelmaking. During continuous melting operations lasting over several days steady state heat loss from the vessel must be expected, therefore a composite refractory construction is provided comprising of a magnesite based working lining (for example) coupled with an insulating backing lining. Water cooled panels at strategic areas and in the roof section may be provided.

Operating under pressure inside the melter unit also means that oxygen lance 50, materials addition chutes such as 51 and 53, and measurement ports 52, must all be sealed to prevent an egress of hot gas containing a high percentage of carbon monoxide, yet be capable of allowing a continuous supply of materials to be added, and in the case of the oxygen lance, allow relative movement inside the vessel.

In operation the melting chamber 47 is charged with hot metal to provide a liquid heel. DRI from furnace 31 is added through the charging system 51 located on the roof into the metal bath. Coal can be added as lump form through chute 53 in the roof, or injected in powder form from coal powder silo 61 through the central hole of a specially designed oxygen lance (not shown). The liquid bath is stirred by the injection of an inert gas e.g. nitrogen, through a tuyere 54 located in the base of the unit. The stirring action assists in the assimilation of the coal and in the melting of the DRI material. Oxygen is blown through a top lance 50 in a manner similar to conventional BOS steelmaking, and is used to combust the coal, the heat of combustion being used to melt the DRI charge. Additions of lime from bin 46 are also made via chute 55 to flux the gangue material from the coal and the DRI, which forms a slag in the melting chamber 47. When all the inputs are matched the rate of heat generation should balance the melting requirements and maintain the bath at a constant temperature, as well as providing an off-gas of constant composition and flow rate. The level of the liquid bath inside the melting unit is held constant, the depth being dictated by the height of the launder 49, and therefore a volume of liquid metal equal to the DRI input rate is constantly overflowing into the launder. The action of the oxygen jet causes the slag layer to foam, which together with particles of metal trapped inside the foam, moves into the launder 49. The launder permits the collapse of part of the slag foam as the metal and slag passes therethrough.

The slag and metal overflow from the melting chamber 47 into the refining container 48, which initially acts as a decanting and settling chamber. The refining container is then allowed to fill up, which gives the opportunity to stir the melt using stirring gases passing through a basal tuyere 56. The liquid metal flowing into this container will be reasonably high in carbon concentration, but it will also be high in sulphur since the majority of the sulphur contained in the coal added in the melting chamber will pass into the metal. There are therefore several courses of action possible in the refining container. Firstly, the high carbon, high sulphur melt, after settling, can be tapped with no internal treatment, allowing decarburisation and desulphurisation to be performed externally; secondly, oxygen can be blown into the melt (possibly through the basal tuyere) to decarburise and allow a low carbon, high sulphur melt to be tapped; or thirdly, carry out a desulphurising treatment within the refining container and tap out a high carbon, low sulphur melt. With this third option, the stirring of the melt, together with top additions of deoxidants through chute 58 should form the slag into a state with a high sulphur partition value. Once desulphurisation has taken place, then the active contents of the refining unit can be tapped out in a controlled manner using a combination of a sliding gate valve situated in the base of the unit (not shown) and side top holes 57 operated similar to a blast furnace tapping procedure. During all of these operations fresh slag and metal will be entering the refining container from the melting chamber. Tapping of the refining container will take place once it approaches its capacity and the various refining steps have taken place.

The integration of a coal based melting unit with a direct reduction plant offers the possibility of a self-contained production unit with no excess gas production. This could be achieved by taking hot gas from the melting unit 30 (through duct 60) and mixing it with recycled top-gas from the direct reduction shaft 31 after removal of oxidised species from the top-gas (as shown at 42). This configuration would allow the production of highly metallised sponge iron which would then form the metallic feedstock to the melter unit. A further energy economy is available when the direct reduction and melting units are closely integrated, by transferring the sponge iron in a hot condition to the melter unit and thus reducing the coal input requirement.

An alternative configuration is possible in which the melting unit off-gas could be cooled to the required shaft inlet gas temperature ($\sim 800°$–$900°$ C.) and passed only once through the direct reduction shaft. The top-gas from the shaft would then be available as fuel for use in finishing processes and for steam raising to power machinery drives. In order to achieve a balance between the melting unit off-gas production and the direct reduction shaft requirement the sponge iron would be produced at less than full metallisation, and the residual oxide phases would be reduced in the melting unit by the addition of coal. Improved energy efficiency by hot charging of sponge iron is also possible in this method of operation. Whilst a 'once through' gas flow circuit would require a higher energy input per output tonne than a recycle system there can be substantial capital cost savings by eliminating the gas treatment equipment needed for scrubbing oxidised species and recompression, and the energy surplus is available as fuel for associated processing stages.

By way of example metallisation ratios of 70%, to even as low as 40% can be provided in the output from furnace 31. This compares most significantly with a normally required metallisation level of well over 90%.

We claim:

1. Apparatus for steelmaking comprising an initial reaction chamber for containing a steel melt arranged to receive source material in the form of scrap, pre-reduced iron or combinations of scrap and pre-reduced iron, an overhead lance for the introduction of an oxidising gas to the initial reaction chamber, means for introducing, below the level of the surface of the melt in the reaction chamber, a melt stirring fluid medium, means for introducing carbonaceous material into the melt; a secondary refining chamber connecting with the initial reaction chamber at the surface level of the melt and through which the metal is arranged to pass from the initial reaction chamber; and a melt holding vessel into which the metal is passed from the secondary refining chamber.

2. Apparatus as claimed in claim 1 wherein the secondary refining chamber comprises a reaction container.

3. Apparatus as claimed in claim 2 wherein the reaction container incorporates means for injecting stirring gas or reagents into the melt therein below the level of the surface thereof.

4. Apparatus as claimed in claim 1 wherein the secondary refining chamber comprises a launder.

5. Apparatus as claimed in claim 1 wherein the carbonaceous material is a coal.

6. Apparatus as claimed in claim 1 wherein means are provided for adding the carbonaceous material to the initial reaction chamber by means of an overhead chute or lance.

7. Apparatus as claimed in claim 1 wherein means are provided for adding fluxing materials and reagents into the initial reaction chamber and the secondary refining chamber.

8. Apparatus as claimed in claim 1 wherein the arrangement is such that slag travels relative to metal in passage through the secondary refining chamber.

9. Apparatus as claimed in claim 1 including means for the introduction of steam into the apparatus.

10. Apparatus as claimed in claim 9 including means for introducing steam into an offtake gas passage from the chambers.

11. Apparatus as claimed in claim 1 wherein an offtake gas passage collecting gases from both chambers passes above the secondary refining chamber such that heat transfer from the passage to the secondary refining chamber can occur.

12. Apparatus as claimed in claim 1 including means for utilising offtake gases from the chambers for pre-heating or pre-reducing the source material for the initial reaction chamber.

13. Apparatus as claimed in claim 12 including a direct reduction furnace arranged to feed direct reduced iron to the initial reaction chamber and to receive said offtake gases.

14. Apparatus as claimed in claim 13 wherein the output from the direct reduction furnace is fed directly to the initial reaction chamber in a hot condition.

15. Apparatus as claimed in claim 13 including means for passing the offtake gases once only through the direct reduction furnace and then out of the apparatus for use as a fuel gas.

16. Apparatus as claimed in claim 13 wherein the initial reaction chamber and the secondary refining vessel are arranged for operation at above atmospheric pressure.

17. Apparatus as claimed in claim 13 wherein the direct reduction furnace has an output of sponge iron of less than 90% metallisation.

18. A method of steelmaking comprising subjecting source material in the form of scrap, pre-reduced iron or combinations of scrap and pre-reduced iron to melting and initial reaction in an initial chamber by the introduction from overhead of an oxidising gas, by the introduction below the level of the surface of the melt of a stirring fluid medium, and by the introduction of carbonaceous material; subjecting the melt to secondary refining in a secondary chamber connecting with the initial chamber at the surface level of the melt.

19. A method as claimed in claim 18 including the step of injecting stirring gas or reagents into the melt in the secondary chamber below the surface of the melt.

20. A method as claimed in claim 18 wherein the carbonaceous material is a coal.

21. A method as claimed in claim 18 wherein fluxing materials or reagents are introduced into the melt in the initial chamber.

22. A method as claimed in claim 18 wherein offtake gases from both initial and secondary chambers is passed in heat transfer relationship above and across the secondary chamber.

23. A method as claimed in claim 18 wherein the offtake gases from the chambers are used for preheating or pre-reducing the source material for the initial chamber.

24. A method as claimed in claim 23 wherein a direct reduction furnace is arranged to feed direct reduced iron to the initial chamber and receive said offtake gases.

25. A method as claimed in claim 23 wherein the offtake gases are passed once only through the direct reduction furnace and then away for use as a fuel gas.

26. A method as claimed in claim 23 wherein the initial chamber and the secondary chamber are operated at above atmospheric pressure.

27. Apparatus as claimed in claim 2 wherein the reaction container incorporates means for injecting stirring gas and reagents into the melt therein below the level of the surface thereof.

28. Apparatus as claimed in claim 1 including means for utilising offtake gases from the chambers for pre-heating and pre-reducing the source material for the initial reaction chamber.

29. A method as claimed in claim 18 including the step of injecting stirring gas and reagents into the melt in the secondary chamber below the surface of the melt.

30. A method as claimed in claim 18 wherein fluxing materials and reagents are introduced into the melt in the initial chamber.

31. A method as claimed in claim 18 wherein the offtake gases from the chambers are used for pre-heating and pre-reducing the source material for the initial chamber.

* * * * *